(12) United States Patent
Murotani et al.

(10) Patent No.: US 11,016,408 B2
(45) Date of Patent: May 25, 2021

(54) IMAGE FORMING APPARATUS WITH REDUCED HEIGHT

(71) Applicant: CANON KABUSHIKI KAISHA, Tokyo (JP)

(72) Inventors: Taku Murotani, Mishima (JP); Mitsuhiro Obara, Suntou-gun (JP); Hiroyuki Fukuhara, Suntou-gun (JP); Yoji Misao, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/907,030

(22) Filed: Jun. 19, 2020

(65) Prior Publication Data

US 2020/0409286 A1 Dec. 31, 2020

(30) Foreign Application Priority Data

Jun. 25, 2019 (JP) .............................. JP2019-117885

(51) Int. Cl.
*G03G 15/04* (2006.01)
*G03G 15/043* (2006.01)
*G02B 5/09* (2006.01)
*G02B 26/10* (2006.01)

(52) U.S. Cl.
CPC ............. *G03G 15/043* (2013.01); *G02B 5/09* (2013.01); *G02B 26/10* (2013.01); *G03G 2215/00383* (2013.01); *G03G 2221/1636* (2013.01)

(58) Field of Classification Search
CPC ............. G03G 21/1666; G03G 15/043; G03G 21/1619; G03G 2221/1636; G03G 2221/1678; G03G 2215/00383; G02B 5/09; G02B 26/10
See application file for complete search history.

(56) References Cited

U.S. PATENT DOCUMENTS

| | | | |
|---|---|---|---|
| 8,786,657 B2 * | 7/2014 | Aruga | G03G 21/1666 347/242 |
| 9,407,780 B2 * | 8/2016 | Sue | G02B 26/121 |
| 2005/0069346 A1 * | 3/2005 | Yamamoto | G03G 15/04045 399/227 |
| 2009/0148173 A1 * | 6/2009 | Tajima | G03G 21/00 399/36 |

(Continued)

FOREIGN PATENT DOCUMENTS

| JP | 2003149895 A | 5/2003 |
|---|---|---|
| JP | 2007178743 A | 7/2007 |
| JP | 2017090769 A | 5/2017 |

*Primary Examiner* — Sophia S Chen
(74) *Attorney, Agent, or Firm* — Canon U.S.A., Inc. I.P. Division

(57) ABSTRACT

An image forming apparatus is provided which forms an image on a recording medium. The image forming apparatus includes a housing; a plurality of photosensitive members which bear respective toner images; a scanning unit which scans surfaces of the plurality of photosensitive members by laser light in accordance with image information; and a recording medium container which contains the recording medium and is detachably mounted in the housing. The scanning unit is disposed under the plurality of photosensitive members and over the recording medium container in the vertical direction, and other components are not interposed between the scanning unit and the recording medium container in the vertical direction.

18 Claims, 14 Drawing Sheets

(56) References Cited

U.S. PATENT DOCUMENTS

| | | | |
|---|---|---|---|
| 2015/0212477 A1* | 7/2015 | Ishidate | G03G 21/1666 347/118 |
| 2016/0179028 A1* | 6/2016 | Murotani | G03G 15/043 347/118 |
| 2017/0299974 A1* | 10/2017 | Kawano | G03G 15/043 |

* cited by examiner

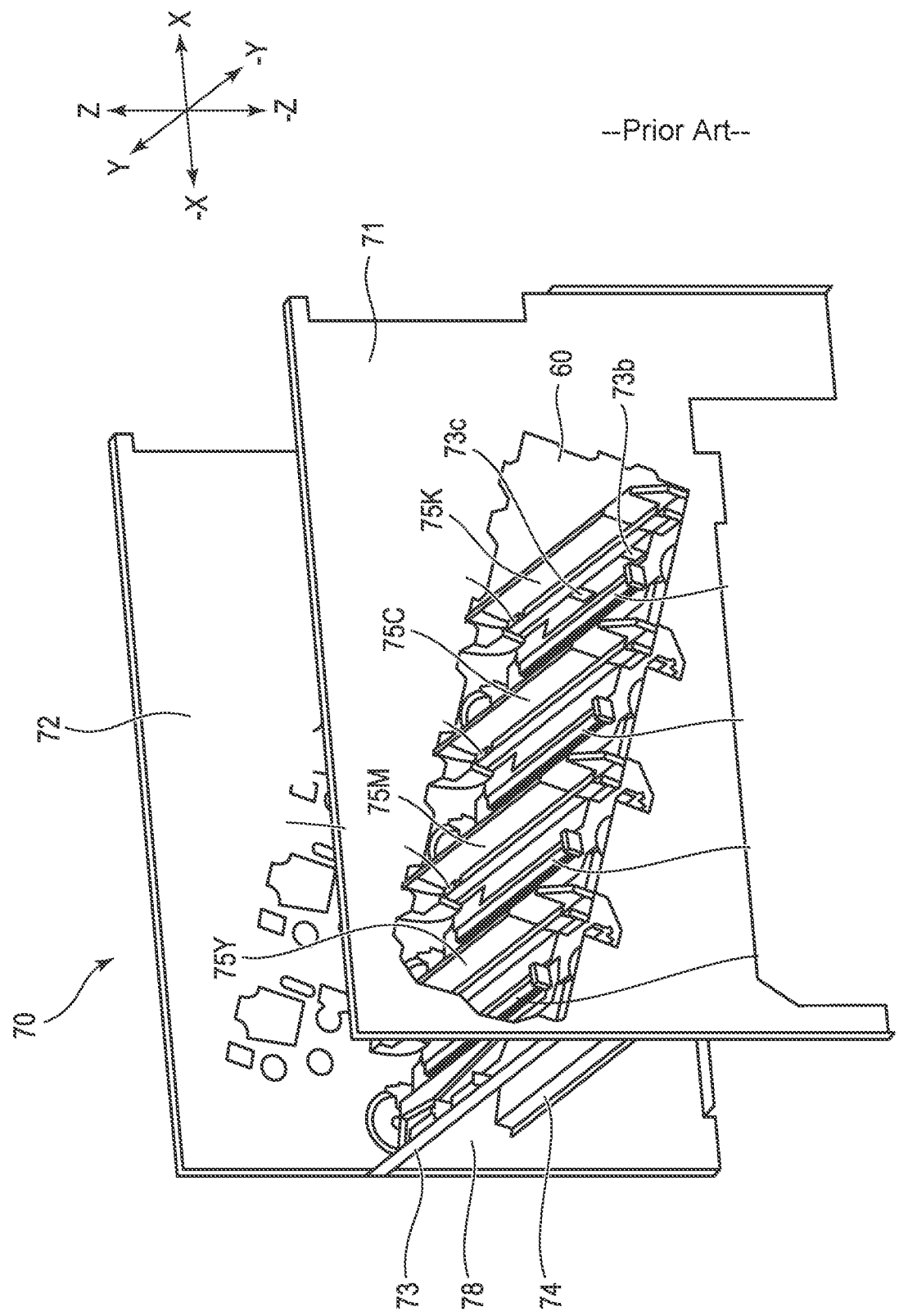

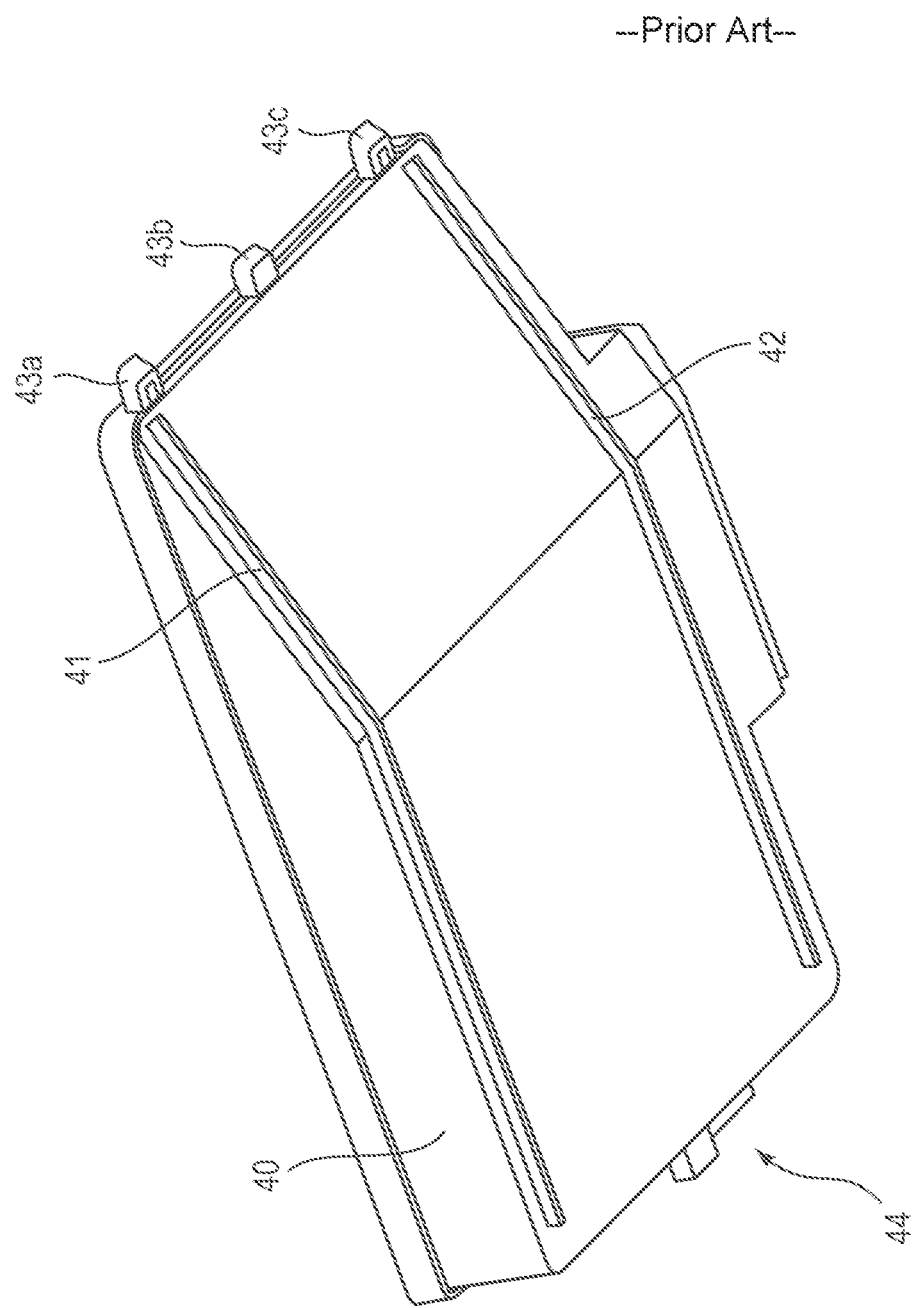

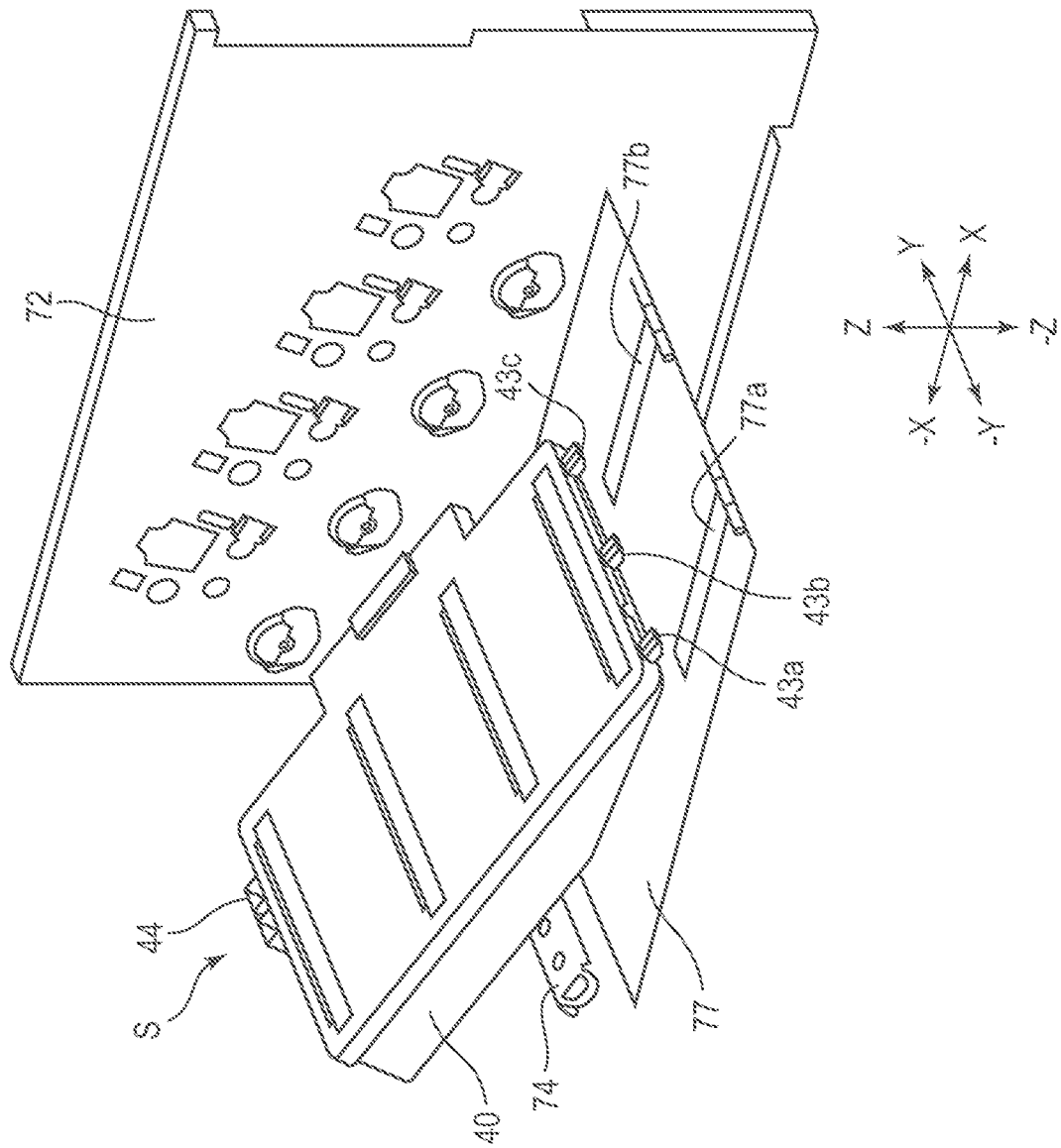

IMAGE FORMING APPARATUS WITH REDUCED HEIGHT

BACKGROUND OF THE DISCLOSURE

Field of the Disclosure

The present disclosure relates to an image forming apparatus employing an electrophotographic process, such as a copier and a printer.

Description of the Related Art

An image forming apparatus that employs an electrophotographic process forms a color image on a recording medium. In this process, the image forming apparatus forms electrostatic latent images on photosensitive members by scanning the photosensitive members using corresponding laser beams in accordance with image information. The electrostatic latent images are made into visual images by using yellow, magenta, cyan, and black toners. Consequently, multicolor toner images are overlaid to form a color image. Japanese Patent Application Laid-Open No. 2017-90769 discloses a method of mounting a scanning unit in the main body of a color image forming apparatus. As illustrated in FIGS. 12, 13, and 14, the image forming apparatus described in Japanese Patent Application Laid-Open No. 2017-90769 includes a front side plate 71-located at the front side of the apparatus body, a rear side plate 72 located at the rear side thereof, and a support member 74 and a lower plate 77 that are disposed between the front side plate 71 and the rear side plate 72 and that supports a scanning unit S. When the scanning unit S is inserted into an opening 78 of the apparatus body, guiding portions 77a and 77b formed on the lower plate 77 guide engagement portions 41 and 42 formed in a bottom portion of an optical box. A frame 70 includes the front side plate 71 and the rear side plate 72. A cartridge holding unit 73, the support member (scanner holding member) 74, and the lower plate (metal plate) 77 are fixed by screws, welding or the like between the front side plate 71 and the rear side plate 72. The scanning unit S is mounted on the frame 70. The scanning unit S is inserted into the inside of the frame 70 through the opening 78. Process cartridges of respective colors are inserted into the cartridge holding unit 73 from an opening portion 60 provided in the front side plate 71. The cartridge holding unit 73 is provided with guide rails 75Y, 75M, 75C, 75K for guiding the process cartridges. The cartridge holding unit 73 is provided with holes 73a (not shown), 73b, and 73c into which projections 43a, 43b, and 43c of the scanning unit S fit. The scanning unit S includes an optical box 40 and a grip portion 44 which an assembly worker grips to hold the scanning unit S.

According to Japanese Patent Application Laid-Open No. 2017-90769, the image forming apparatus requires the lower plate 77 provided between the scanning unit S and a cassette in which recording media (sheets of paper) are contained. Here, there is a room for improvement in height reduction of the image forming apparatus.

SUMMARY OF THE DISCLOSURE

Accordingly, the present disclosure provides an image forming apparatus that leads to height reduction.

The present disclosure provides an image forming apparatus which forms an image on a recording medium, the image forming apparatus comprising: a housing; a plurality of photosensitive members which bears respective toner images; a scanning unit which scans surfaces of the plurality of photosensitive members by laser light in accordance with image information; and a recording medium container which contains the recording medium and is detachably mounted in the housing, wherein the scanning unit is disposed under the plurality of photosensitive members and over the recording medium container in the vertical direction, and other components are not interposed between the scanning unit and the recording medium container in the vertical direction.

Further features and aspects of the present disclosure will become apparent from the following description of example embodiments with reference to the attached drawings.

BRIEF DESCRIPTION OF THE DRAWINGS

FIG. 12 is a view illustrating a known image forming apparatus.

FIG. 13 is a view illustrating a known scanning unit.

FIG. 14 is another view illustrating the known image forming apparatus.

DESCRIPTION OF THE EMBODIMENTS

[Example Overall Structure of Image Forming Apparatus]

Figure 1:
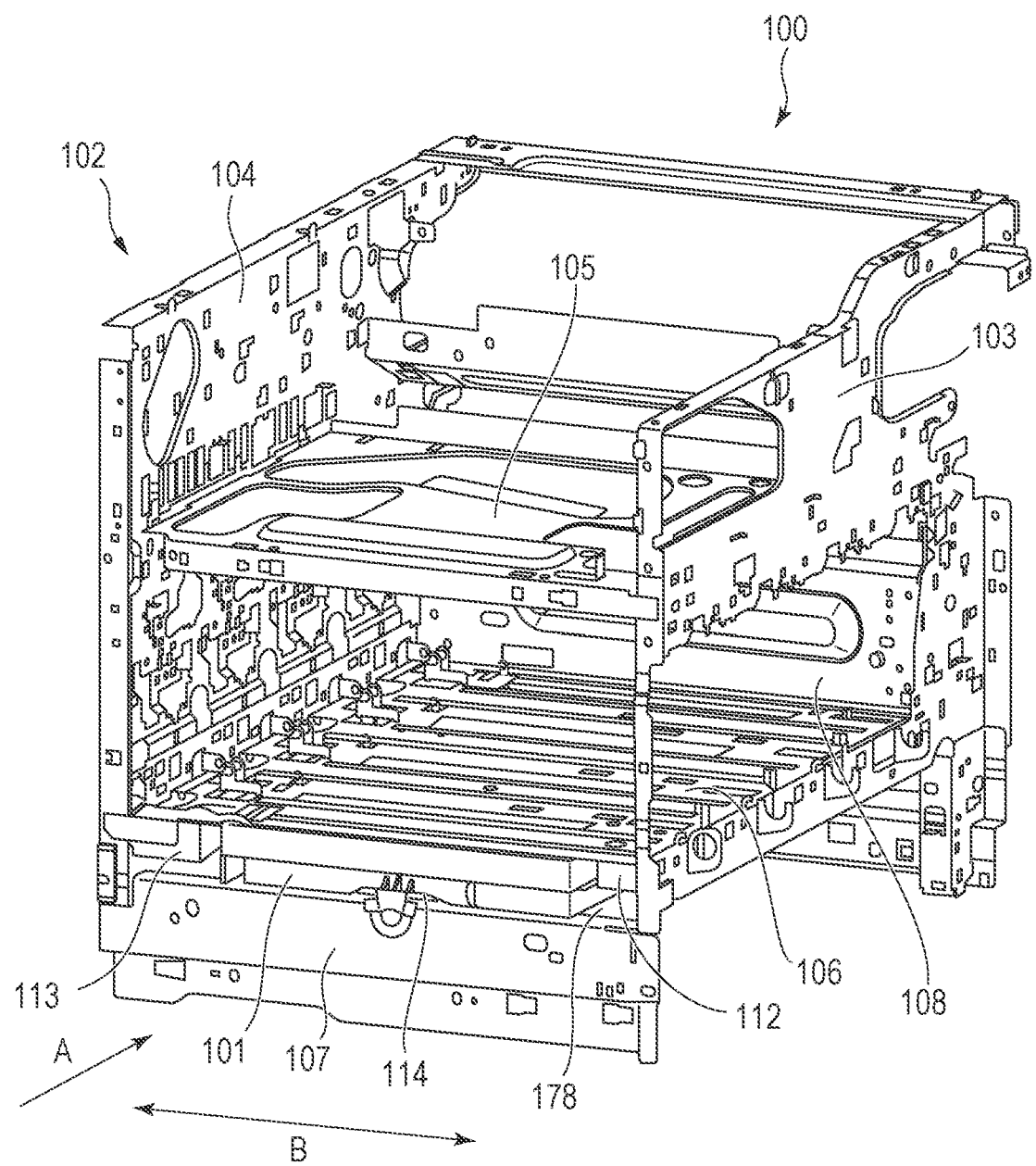
FIG. 1 is a perspective view illustrating an example housing of an example image forming apparatus.

FIG. 1 is a perspective view of a housing (i.e., frame) 102 of an image forming apparatus (i.e., printer) 100 according to an embodiment, illustrating a state in which a scanning unit 101 is mounted in the housing 102. Note that the image forming apparatus 100 according to the present embodiment is a color image forming apparatus that forms a full color image by overlaying toner images of four colors, in other words, yellow, cyan, magenta, and black. The housing 102 includes a front side plate 103, a rear side plate 104, an upper plate 105, a middle plate 106, and a left side plate 107. The front side plate 103 has an opening 108 for mounting a cartridge (not illustrated) which contains a photosensitive member and a development unit. In addition, the middle plate 106 and the left side plate 107 define an opening 178 for mounting the scanning unit 101 therethrough in the direction of arrow A. The housing 102 is assembled by using a known method, for example, by welding or screw-fixing press-formed metal sheets having a thickness of approximately 1 mm. Support members 112 and 113 are disposed on the middle plate 106 and serve to guide the scanning unit 101 during installation. A fixing spring 114 is provided for fixing the scanning unit 101 to the left side plate 107.

Figure 2:
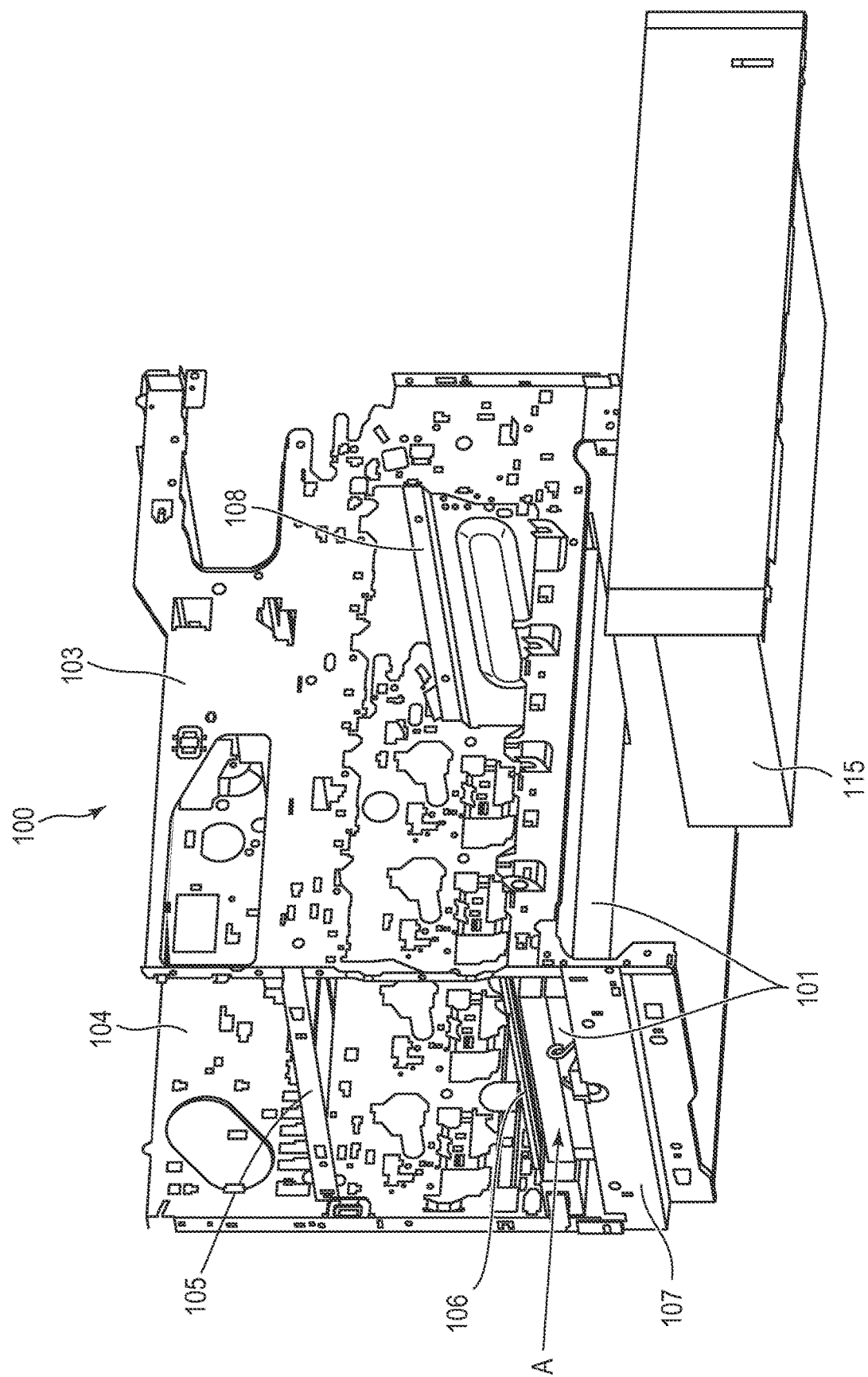
FIG. 2 is a perspective view illustrating a state in which a cassette is taken out of the housing.

FIG. 2 is a perspective view illustrating a state in which a cassette (i.e., recording medium container) 115 is taken out of the image forming apparatus 100. In the vertical direction, the scanning unit 101 is disposed under the cartridge (not illustrated) and over the cassette 115 in which recording media are contained. For the purpose of size reduction, a metal sheet for forming the housing is not disposed between the scanning unit 101 and the cassette 115. Accordingly, as illustrated in FIG. 2, when the cassette 115 is taken out of the image forming apparatus 100, the scanning unit 101 is exposed in the space in which the cassette 115 has been mounted. In other words, the scanning unit 101 is mounted at such a position that the scanning unit 101 can be seen from the outside of the image forming apparatus when the recording medium container 115 is removed.

Scanning Unit 101

Figure 3:
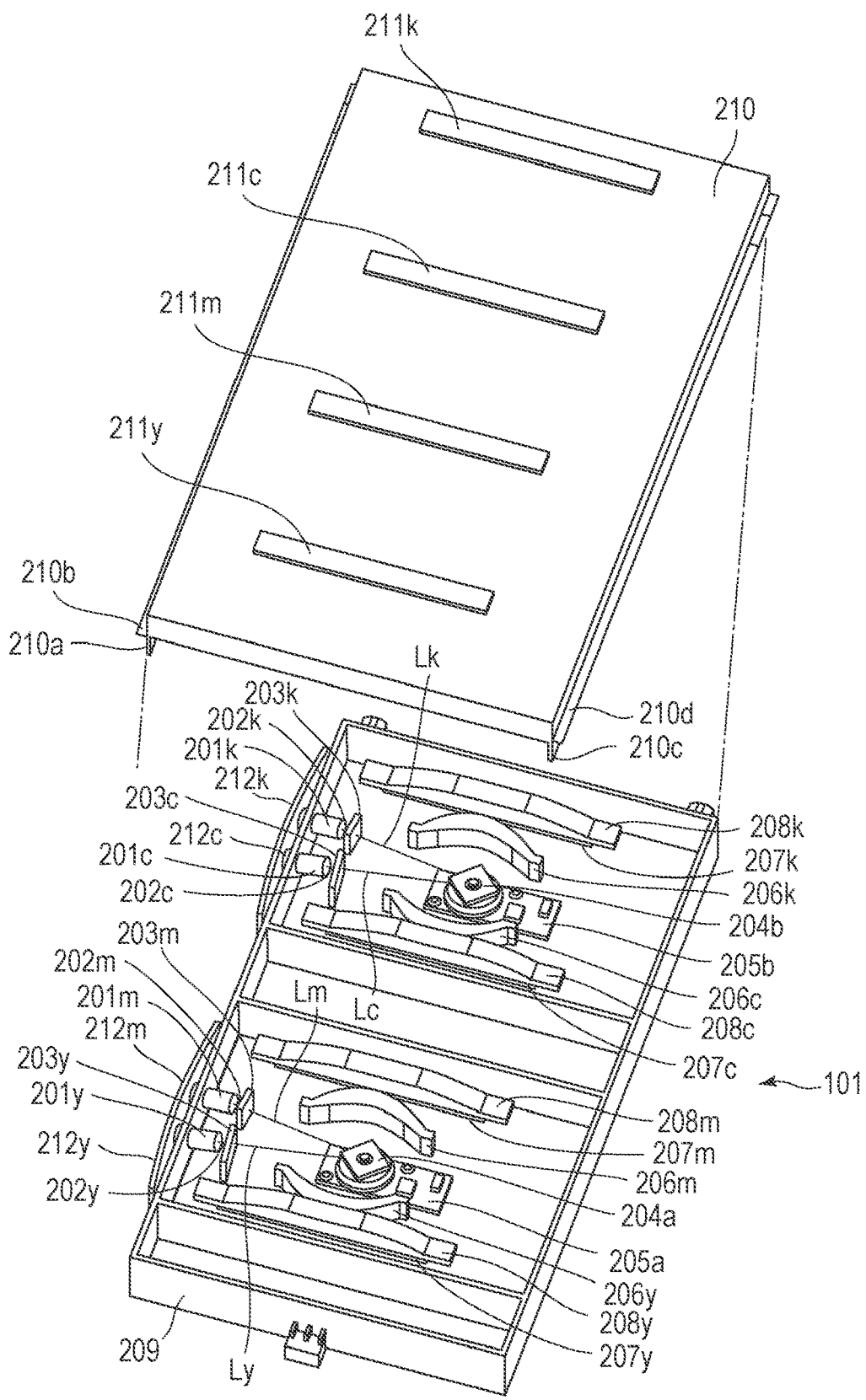
FIG. 3 is a perspective view illustrating an example scanning unit.
Figure 4:
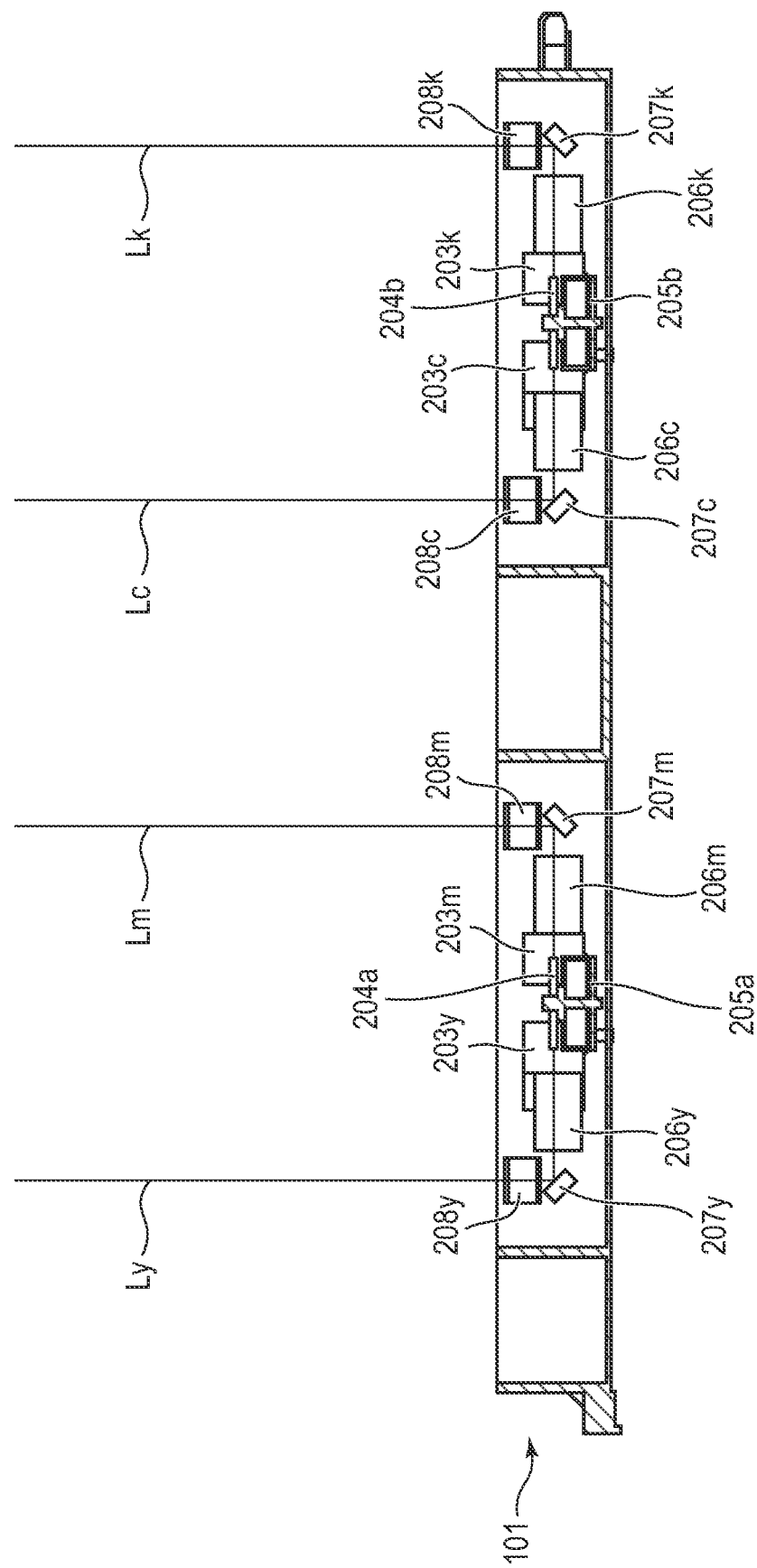
FIG. 4 is a cross-sectional view illustrating the scanning unit.

FIG. 3 is a perspective view of the scanning unit 101, illustrating a state in which a lid member 210 is unmounted. FIG. 4 is a cross-sectional view of the scanning unit 101, in which the lid member 210 is omitted. References 201y, 201m, 201c, and 201k denote light source units corresponding to the four colors, which are yellow, cyan, magenta, and black. Each light source unit emits laser light in accordance with corresponding image information. References 202y, 202m, 202c, and 202k denote collimator lenses, and references 203y, 203m, 203c, and 203k denote cylindrical lenses. References 204a and 204b denote polygon mirrors (i.e., rotatable polygon mirrors), and references 205a and 205b are motor-driving boards each of which has a motor for rotating a corresponding polygon mirror. References 206y, 206m, 206c, and 206k denote first scanning lenses, and references 208y, 208m, 208c, and 208k denote second scanning lenses. References 207y, 207m, 207c, and 207k are reflection mirrors. Reference 209 denotes an optical box which contains the above-described optical components, and reference 210 denotes a lid member that covers the optical box 209.

References 211y, 211m, 211c, and 211k denote transparent glass pieces (i.e., light transmissive members) that cover respective laser light emitting holes of the lid member 210 but allow laser light to pass. The glass pieces are fixed to the lid member 210 using, for example, an adhesive or a double-sided adhesive tape. References 212y, 212m, 212c, and 212k denote circuit boards that drive corresponding semiconductor lasers. The circuit boards are fixed to an outside surface of the optical box 209. The circuit boards 212y, 212m, 212c, and 212k include respective semiconductor lasers and electric circuits for activating the semiconductor lasers. The semiconductor lasers are mounted in corresponding light source units 201y, 201m, 201c, and 201k.

The lid member 210 has covering portions 210a and 210c that cover side surfaces of the optical box 209. A guide portion 210b protrudes from the covering portion 210a, and a guide portion 210d protrudes from the covering portion 210c. The covering portion 210a also covers the circuit boards 212y, 212m, 212c, and 212k. The guide portions 210b and 210d are used to guide the scanning unit 101 when the scanning unit 101 is inserted in the housing 102.

In the following description, an optical scanning system that emits laser light for forming a yellow toner image is referred to as a "Y station" for convenience. Similarly, optical scanning systems for forming magenta, cyan, and black toner images are referred to as an "M station", a "C station", and a "K station", respectively. The scanning units 101 includes two motors 205a and 205b. The motor 205a serves for the Y station and the M station, and the motor 205b serves for the C station and the K station. The following describes operation of the Y station and the M station.

A laser beam Ly, which is emitted from the light source unit 201y containing the semiconductor laser, is made into a substantially parallel beam by the collimator lens 202y and is subsequently incident on the cylindrical lens 203y. The laser beam Ly incident on the cylindrical lens 203y is emitted as a parallel beam with respect to the main scanning section while the beam is condensed with respect to the sub-scanning section. The laser beam Ly is subsequently incident on the polygon mirror 204a, which deflects the laser beam Ly. The deflected laser beam Ly passes through the first scanning lens 206y and is reflected by the reflection mirror 207y. The laser beam Ly subsequently passes through the second scanning lens 208y and forms an image on a photosensitive member 301y.

A laser beam Lm, which is emitted by the light source unit 201m that is positioned side by side with the light source unit 201y, passes through the collimator lens 202m and the cylindrical lens 203m. The laser beam Lm is subsequently deflected by a surface of the polygon mirror 204a, which is different from the surface that deflects the Laser beams Ly. The deflected laser beam Lm is guided to a photosensitive member 301m by the first scanning lens 206m, the reflection mirror 207m, and the second scanning lens 208m. Note that the C station and the K station operate similarly to the Y station and the M station, the description of which will be omitted.

Image Forming Process

Figure 5:
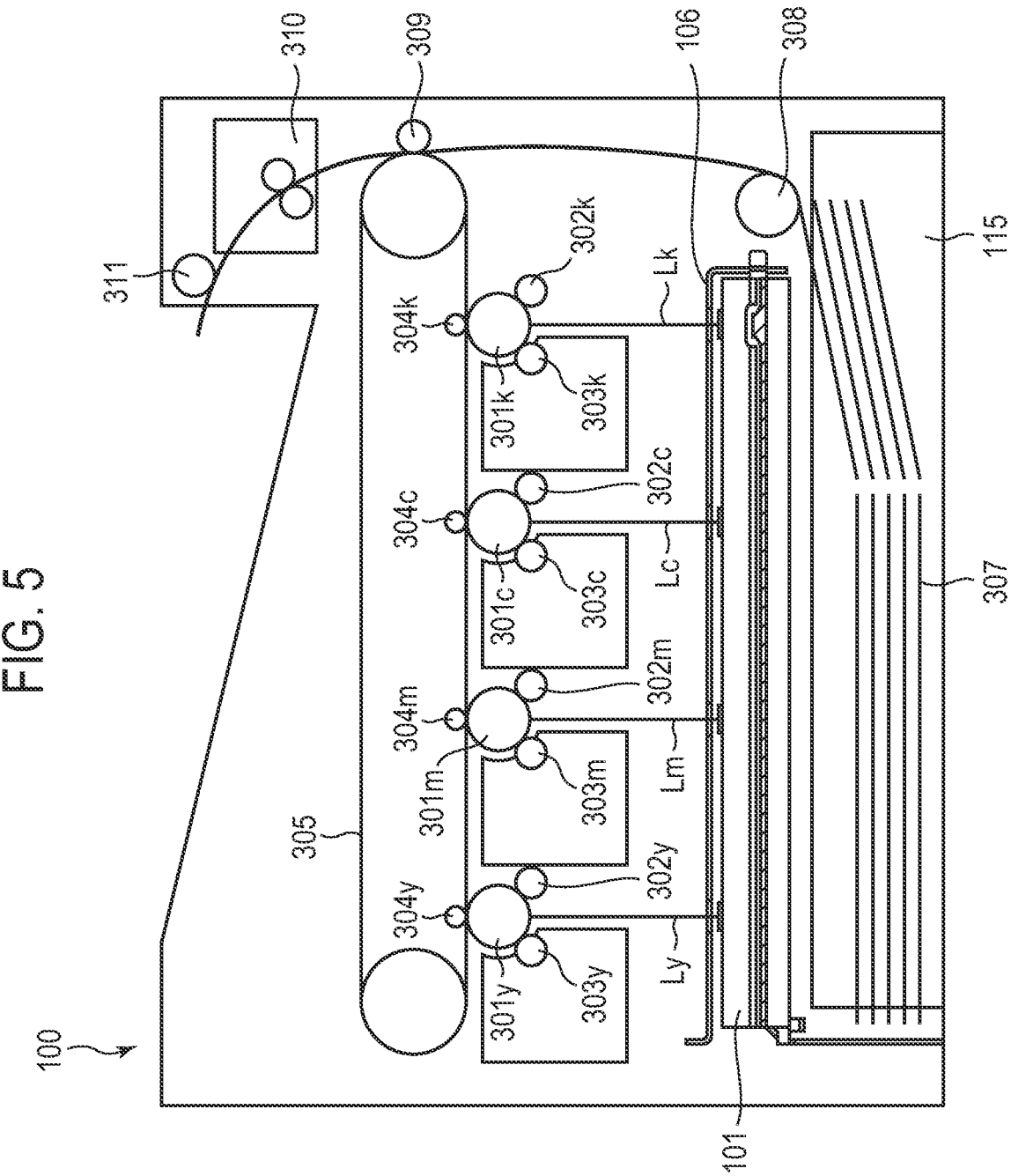
FIG. 5 is a cross-sectional view for explanation of an example image forming process.

FIG. 5 is a cross-sectional view illustrating the image forming apparatus 100. The scanning unit 101, which is disposed under the photosensitive members 301y, 301m, 301c, and 301k, scans these photosensitive members by using respective laser beams Ly, Lm, Lc, and Lk. Prior to the scanning, charging units 302y, 302m, 302c, and 302k charge corresponding photosensitive members 301y, 301m, 301c, and 301k, and laser beam irradiation forms electrostatic latent images on the photosensitive members. The electrostatic latent images are developed into toner images by development units 303y, 303m, 303c, and 303k. The toner images formed on respective photosensitive members are transferred onto an intermediate transfer belt 305 and overlaid on each other by primary transfer rollers 304y, 304m, 304c, and 304k to which voltage is applied. On the other hand, recording media are contained in the cassette 115 disposed under the scanning unit 101, and a pickup roller 308 picks up a recording medium 307 in synchronization with the above image forming process. The overlaid toner image on the intermediate transfer belt 305 is further transferred onto the recording medium 307 by a secondary transfer roller 309 to which voltage is applied. The recording medium 307 supporting the toner image is subjected to fixing treatment at a fixing unit 310, which fixes the toner image to the recording medium 307. Consequently, the recording medium 307 is discharged from the apparatus by a roller 311.

Example Method of Mounting Scanning Unit

Figure 6:
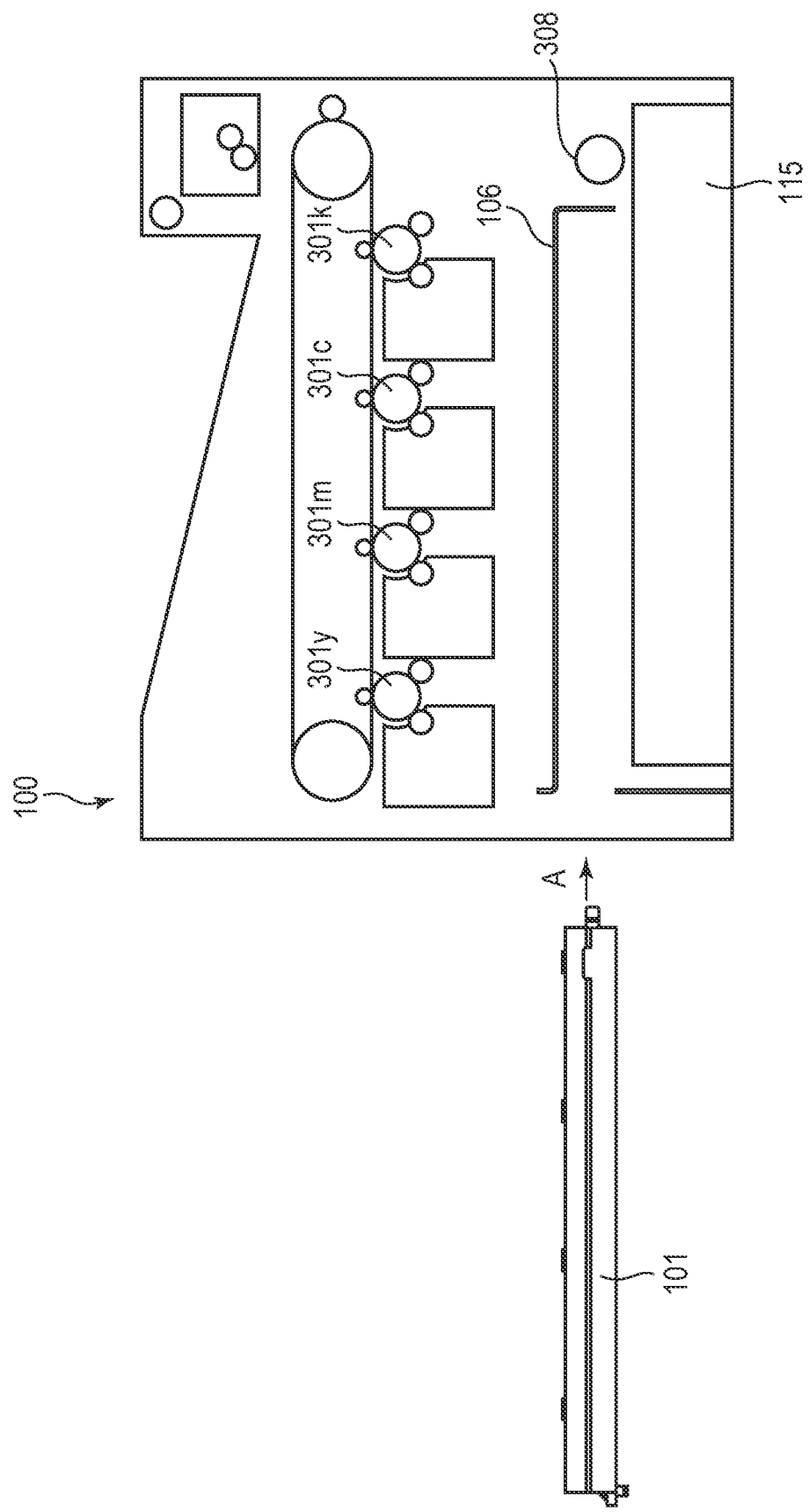
FIG. 6 is a cross-sectional view for explanation of example mounting of the scanning unit in the image forming apparatus

Next, a method of mounting the scanning unit 101 in the image forming apparatus 100 will be described. When the scanning unit 101 is inserted into the image forming apparatus 100, as illustrated in FIG. 6, the scanning unit 101 is moved in the direction of arrow A from the left of the image forming apparatus 100. The insertion direction (i.e., the arrow A direction) is parallel to the direction of photosensitive members 301y, 301m, 301c, and 301k that are arranged in a row.

Figure 7:
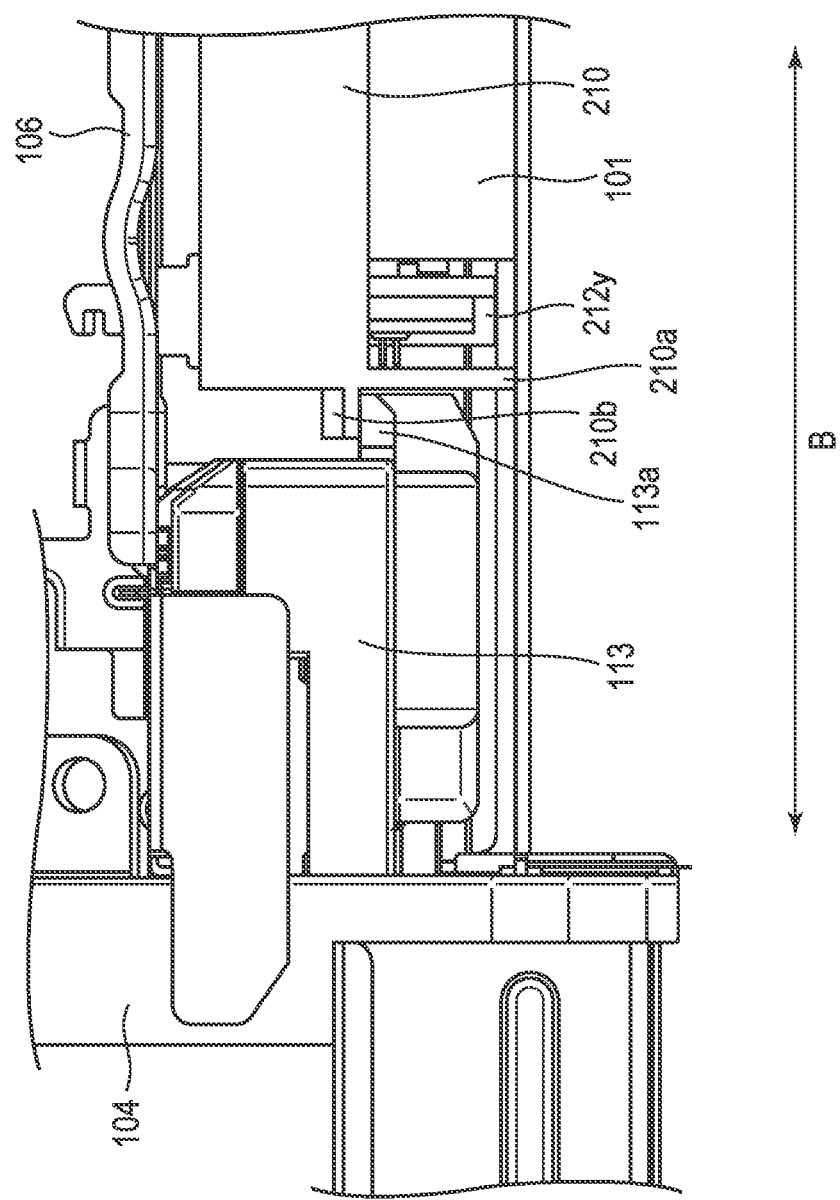
FIG. 7 is an enlarged view illustrating an example support member and other components in the vicinity of the support member.
Figure 8:
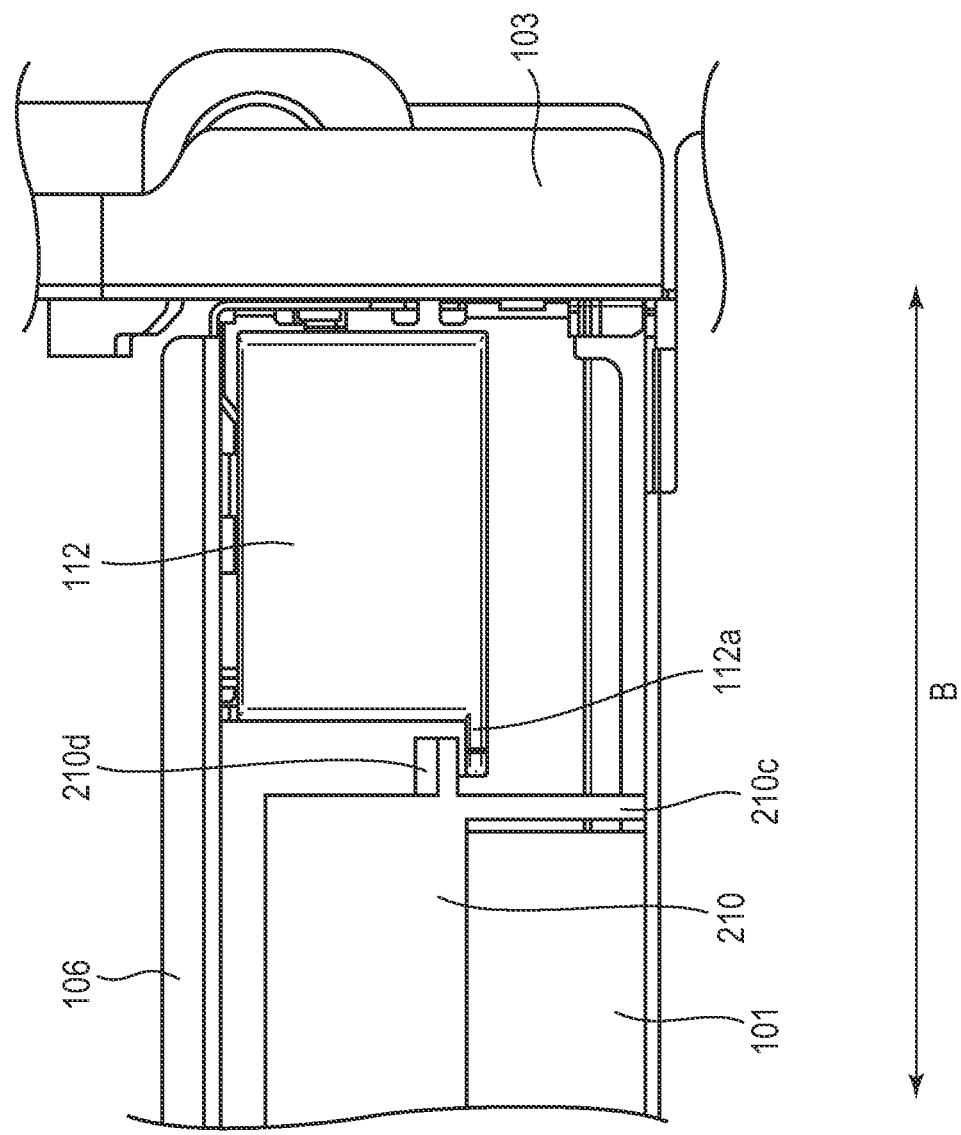
FIG. 8 is an enlarged view illustrating another example support member and other components in the vicinity of the support member.

FIG. 7 is an enlarged view illustrating a structure around a support member 113 that is fixed to the middle plate 106 when the image forming apparatus 100 is viewed in the direction of arrow A of FIG. 6. FIG. 8 is an enlarged view illustrating a structure around a support member 112 that is fixed to the middle plate 106 when the image forming apparatus 100 is viewed in the direction of arrow A of FIG. 6.

When the scanning unit 101 is inserted, the leading end of the scanning unit 101 in the insertion direction is first inserted into the space between the middle plate 106 and the left side plate 107 of the housing 102. Here, as illustrated in FIG. 7, the guide portion 210b formed on the lid member 210 is placed on the supporting portion 113a of the support member 113 that is fixed to the middle plate 106. Likewise, as illustrated in FIG. 8, the guide portion 210d formed on the lid member 210 is placed on the supporting portion 112a of the support member 112 that is fixed to the middle plate 106. Subsequently, the scanning unit 101 is pushed into the housing 102 such that the guide portions 210b and 210d are slid on the corresponding supporting portions 113a and 112a in the direction of arrow A of FIGS. 1 and 2. Thus, the scanning unit 101 is inserted into the housing 102. As can be seen from FIGS. 7 and 8, the scanning unit 101 is disposed between the two support members 112 and 113 in the direction of arrow B (in other words, the direction orthogonal to the direction of arrow A, which is the main scanning direction of laser light).

Figure 9A:
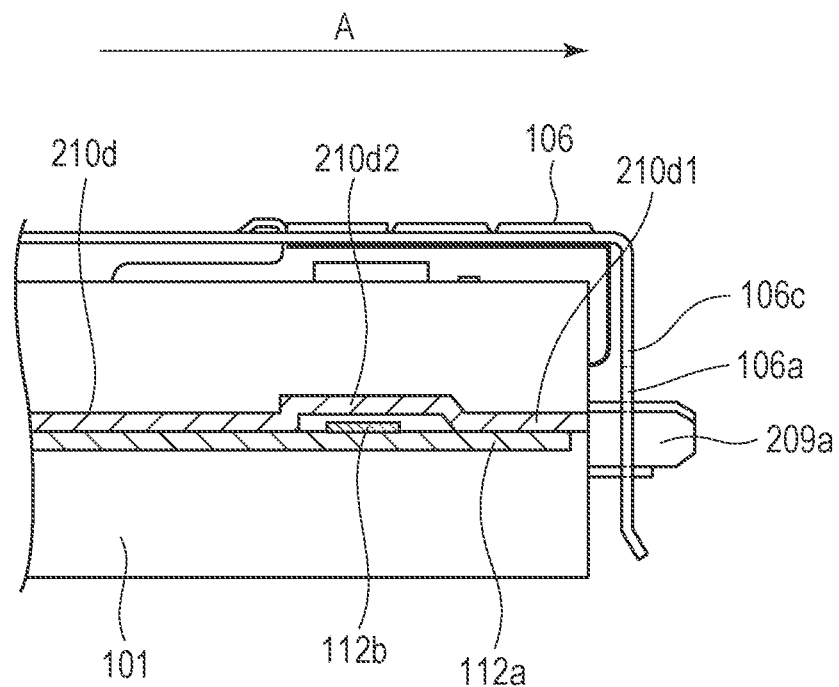
FIG. 9A is a view for explanation of example mounting of the scanning unit.
Figure 10:
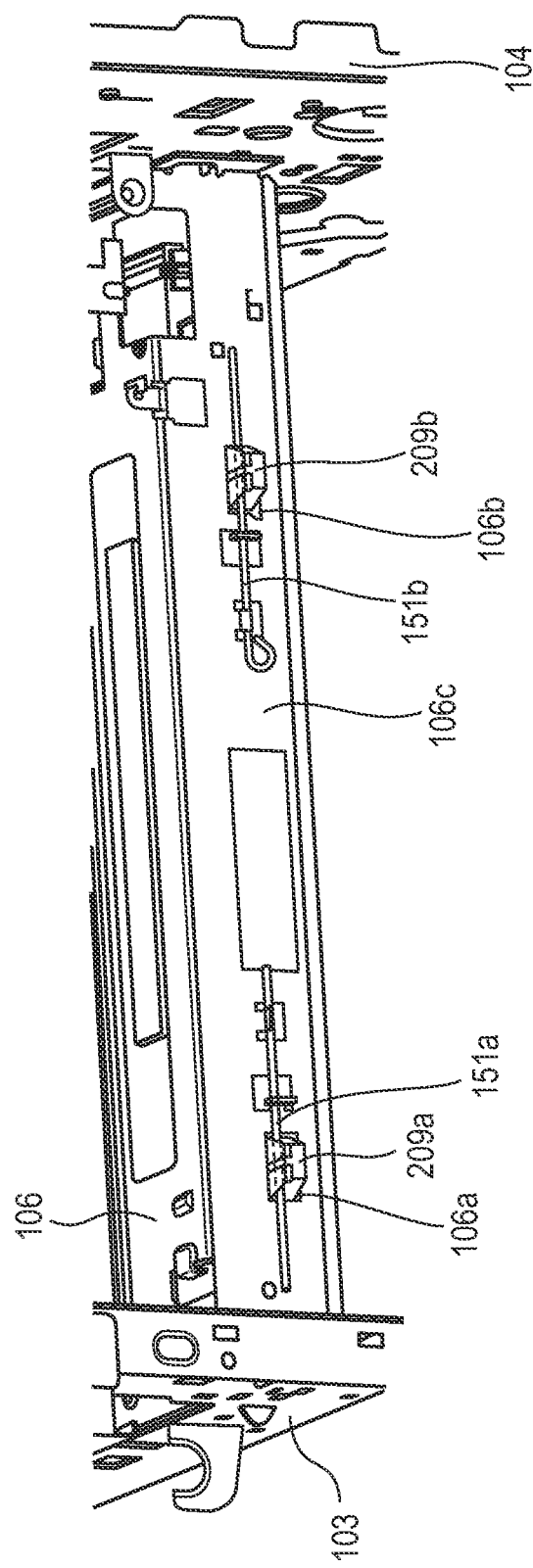
FIG. 10 is another view for explanation of mounting of the scanning unit.

As illustrated in FIG. 9A, when the scanning unit 101 is slid in the arrow A direction, the end portion 210d1 of the guide portion 210d runs onto a protrusion 112b formed on the supporting portion 112a. This raises projections 209a and 209b vertically upward (209b is illustrated in FIG. 10). The projections 209a and 209b are tip portions of the optical box 209 of the scanning unit 101. Here, the lower surfaces of the projections 209a and 209b are positioned slightly higher vertically than the lower surfaces of insertion holes 106a and 106b (106b is illustrated in FIG. 10) that are formed in a bent portion 106c of the middle plate 106. The bent portion 106c is formed by bending one end of the middle plate 106. This facilitates insertion of the projections 209a and 209b into the insertion holes 106a and 106b. In the state of the tips of projections 209a and 209b being in the insertion holes 106a and 106b, the scanning unit 101 is further pushed in the arrow A direction, and the projections 209a and 209b completely enter the insertion holes 106a and 106b. Here, a recess 210d2 of the guide portion 210d is positioned at the protrusion 112b of the supporting portion 112a, and the tip portions of the optical box 209 are lowered vertically. The tip portions of the optical box 209 are lowered until the lower surfaces of the projections 209a and 209b abut the lower surfaces of the insertion holes 106a and 106b.

Figure 9B:
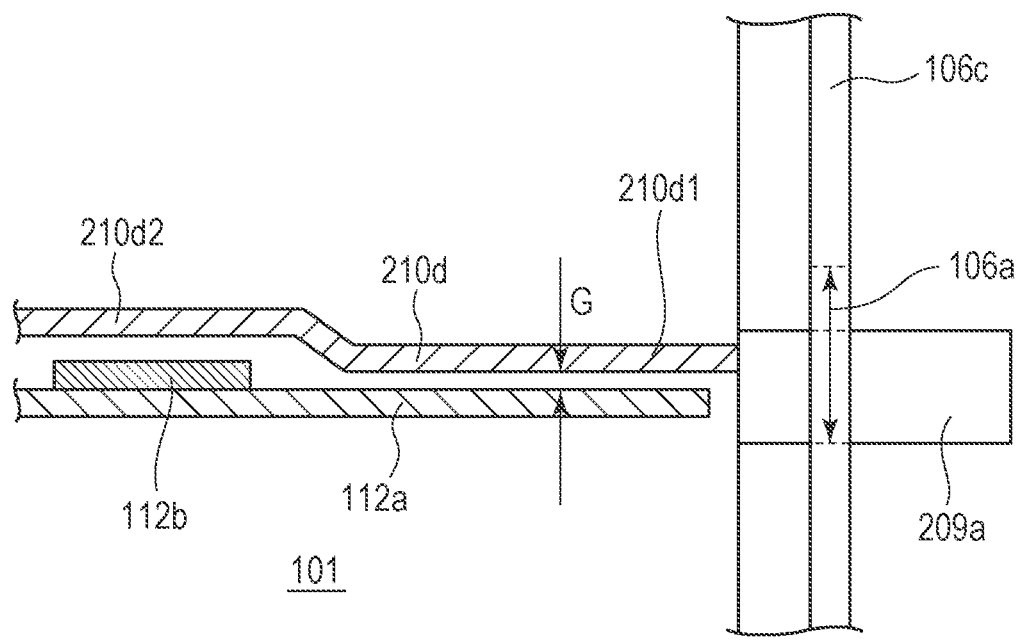
FIG. 9B is another view for explanation of mounting of the scanning unit.

FIG. 9B illustrates a state in which the scanning unit 101 is completely inserted in the direction of arrow A. The insertion hole 106a is formed in a region indicated by the arrow in FIG. 9B (the same applies to the insertion hole 106b). In this state, the lower surface of the projection 209a abuts the lower surface of the insertion hole 106a. In addition, the guide portion 210d is spaced from the supporting portion 112a (reference G denotes the gap therebetween).

In the state of the projections 209a and 209b being inserted in the insertion holes 106a and 106b, as illustrated in FIG. 10, the projections 209a and 209b are pressed on the lower surfaces of the insertion holes 106a and 106b of the middle plate 106 by a pair of wire springs 151a and 151b that are fixed to the bent portion 106c. The scanning unit 101 is thereby fixed to the middle plate 106. Subsequently, as illustrated in FIG. 1, the scanning unit 101 is also fixed to the left side plate 107 by attaching the fixing spring 114 to the left side plate 107. Thus, mounting of the scanning unit 101 is completed. In the state of the scanning unit 101 being fixed, as illustrated in FIG. 9B, the guide portion 210d is not in contact with the supporting portion 112a, and the guide portion 210b is not in contact with the supporting portion 113a. Note that in the present embodiment, the protrusion 112b has been described as being formed on the supporting portion 112a, but the protrusion may be formed on the guide portion 210b of the lid member.

Figure 11:
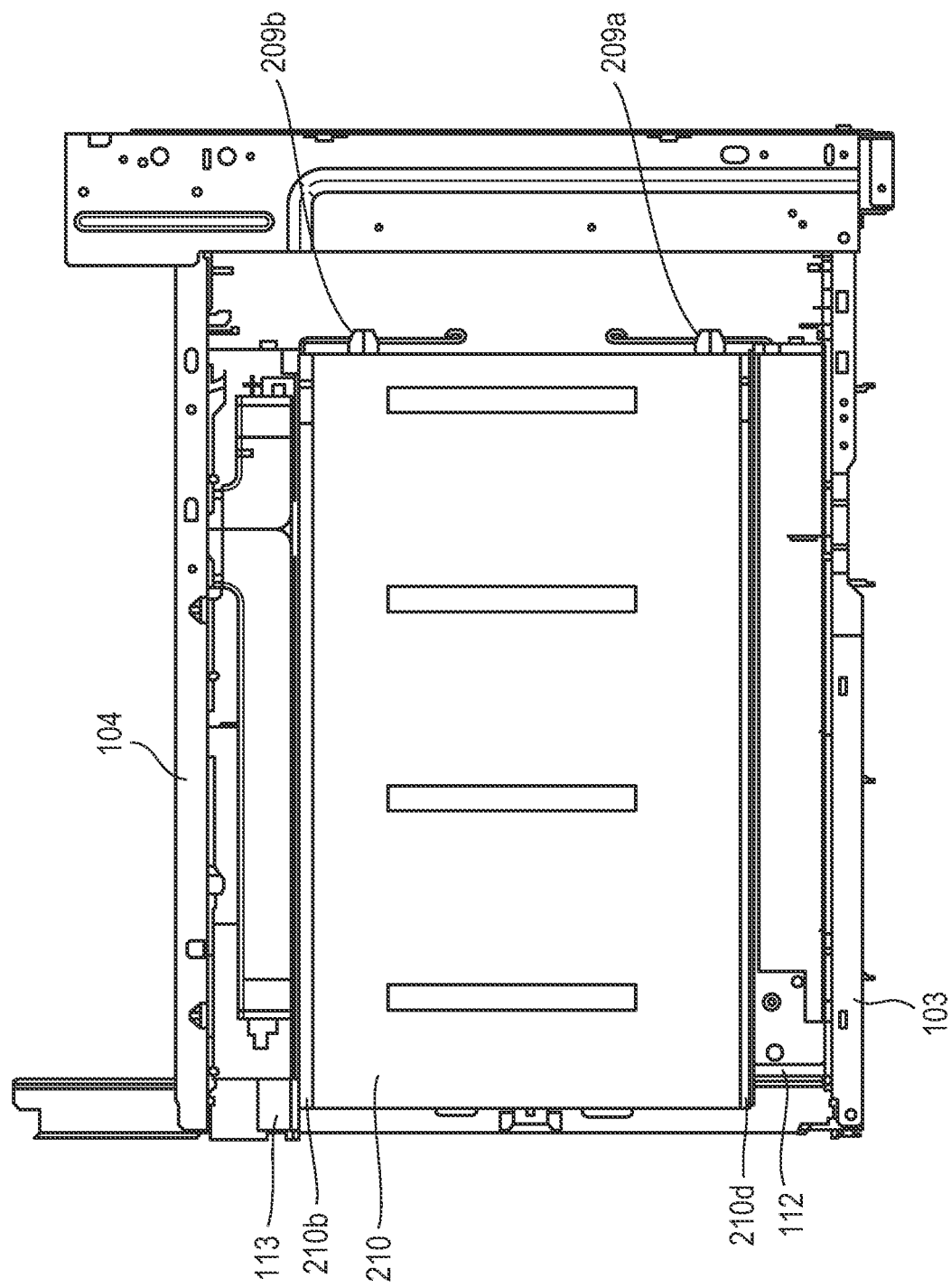
FIG. 11 is a view illustrating the scanning unit as viewed from above the image forming apparatus.

In the direction of arrow B, the width of the scanning unit 101 including the guide portions 210b and 210d is greater than the span between the supporting portions 112a and 113a, which thereby prevents the scanning unit 101 from falling off the supporting portions 112a and 113a. In the direction of arrow B, the clearance between the end of the guide portion 210b and the root of the supporting portion 113a and the clearance between the end of the guide portion 210d and the root of the supporting portion 112a are in the order of several millimeters. The amount of movement of the scanning unit 101 can be thereby restricted to several millimeters in the direction of arrow B, which can stabilize the scanning unit 101 during insertion and can facilitate smooth insertion. In addition, when the scanning unit 101 is viewed vertically from above, as illustrated in FIG. 11, the guide portions 210b and 210d of the lid member 210 extending in the direction of arrow A are disposed so as to overlap part of the support members 112 and 113.

Note that in the present embodiment, the guide portions have been described as being formed in the lid member 210, but the guide portions may be formed in the optical box 209.

As described above, the image forming apparatus for forming an image on a recording medium according to the present embodiment includes the housing, the photosensitive members that support respective toner images and are disposed in the housing, the scanning unit that scans the surfaces of the photosensitive members by using laser light in accordance with image information, and the recording medium container which contains the recording medium and is detachably mounted in the housing. In the vertical direction, the scanning unit is disposed under the photosensitive members and over the recording medium container, and other components are not interposed between the scanning unit and the recording medium container. With this configuration, the image forming apparatus that leads to height reduction can be provided.

In the image forming apparatus according to the present embodiment, when a user takes the cassette 115 out of the housing, the scanning unit 101 is exposed. Laser beams are emitted out of the scanning unit 101 through glass pieces 211y, 211m, 211c, and 211k. The guide portions 210b and 210d used for mounting the scanning unit 101 in the housing 102 minimize paths from the glass pieces toward the outside of the image forming apparatus 100. This improves the safety of the apparatus. In addition, in a case of toner escaping from the development unit 303y, 303m, 303c, and 303k, the toner is collected at the overlapped portion of the guide portions of the optical box 209 or the lid member 210 and the support members 112 and 113 of the housing 102. This can prevent the toner from adhering to recording media contained in the cassette 115.

According to the present embodiment, a lower plate disposed between the cassette 115 and the scanning unit 101 can be eliminated, and an image forming apparatus that leads to height reduction can be provided.

While the present disclosure has been described with reference to example embodiments, it is to be understood that the disclosure is not limited to the disclosed example embodiments. The scope of the following claims is to be accorded the broadest interpretation so as to encompass all such modifications and equivalent structures and functions.

This application claims the benefit of Japanese Patent Application No. 2019-117885, filed Jun. 25, 2019, which is hereby incorporated by reference herein in its entirety.

What is claimed is:

1. An image forming apparatus which forms an image on a recording medium, the image forming apparatus comprising:
a housing;
a plurality of photosensitive members which bear respective toner images;
a scanning unit which scans surfaces of the plurality of photosensitive members by laser light in accordance with image information, the scanning unit including a rotatable polygon mirror, an optical box which contains the rotatable polygon mirror, and a lid member which covers an opening of the optical box; and
a recording medium container which contains the recording medium and is detachably mounted in the housing,
wherein the scanning unit is disposed under the plurality of photosensitive members and over the recording medium container in a vertical direction, and other components are not interposed between the scanning unit and the recording medium container in the vertical direction,
wherein the scanning unit is configured such that when the scanning unit is inserted into the housing, guide portions disposed on the optical box or on the lid member are guided by a pair of support members disposed in the housing, and
wherein the scanning unit is disposed between the pair of support members in a direction orthogonal to an insertion direction of the scanning unit into the housing.

2. The image forming apparatus according to claim 1, wherein the scanning unit is disposed at such a position that the scanning unit can be viewed from outside of the image forming apparatus when the recording medium container is detached from the image forming apparatus.

3. The image forming apparatus according to claim 1, wherein the lid member includes a first cover portion for covering one side surface of the optical box and a second cover portion for covering the other side surface of the optical box opposite from the one side surface, and
wherein among the guide portions, a first guide portion is provided on the first cover portion, and a second guide portion is provided on the second cover portion.

4. The image forming apparatus according to claim 3, further comprising:
a light source emitting the laser light for scanning one of the plurality of photosensitive members; and
a circuit board including an electrical circuit for driving the light source,
wherein the first cover portion is provided so as to cover the circuit board.

5. The image forming apparatus according to claim 3, wherein each of the guide portions has an elongated shape along an arrangement direction of the plurality of photosensitive members.

6. The image forming apparatus according to claim 5, wherein as seen in a direction perpendicular to a plane of the lid member, each of the guide portions and the pair of the support members are overlap with each other along the arrangement direction.

7. The image forming apparatus according to claim 1, wherein each of the guide portions has an elongated shape along an arrangement direction of the plurality of photosensitive members.

8. The image forming apparatus according to claim 7, wherein as seen in a direction perpendicular to a plane of the lid member, each of the guide portions and the pair of the support members are overlap with each other along the arrangement direction.

9. The image forming apparatus according to claim 1, wherein the housing includes a first side plate, a second side plate facing the first side plate, and a middle plate provided across the first side plate and the second side plate, and
wherein the pair of support members are fixed on the middle plate.

10. The image forming apparatus according to claim 9, wherein the middle plate includes a hole for inserting a projection of the scanning unit.

11. The image forming apparatus according to claim 10, wherein the housing includes a third side plate connecting with the first side plate and the second side plate, and
wherein a leading end portion of the scanning unit in the insertion direction of the scanning unit is fixed on the middle plate, and a trailing end portion of the scanning unit in the insertion direction of the scanning unit is fixed on the third side plate.

12. The image forming apparatus according to claim 1, wherein in a state where the scanning unit is fixed to the housing, the guide portions are not in contact with the pair of support members.

13. An image forming apparatus which forms an image on a recording medium, the image forming apparatus comprising:
a housing;
a plurality of photosensitive members which bear respective toner images;
a scanning unit which scans surfaces of the plurality of photosensitive members by laser light in accordance with image information, the scanning unit includes a rotatable polygon mirror, an optical box which contains the rotatable polygon mirror, and a lid member which covers an opening of the optical box; and
a recording medium container which contains the recording medium and is detachably mounted in the housing,
wherein the scanning unit is located at a position between the plurality of photosensitive members and the recording medium container in a vertical direction,
wherein the scanning unit includes a pair of guided portions on the optical box or on the lid member,
wherein the housing includes a pair of support members for supporting and guiding the pair of guided portions when the scanning unit is inserted into the housing, and
wherein the scanning unit is located at a position between the pair of support members in a direction orthogonal to an insertion direction of the scanning unit into the housing.

14. The image forming apparatus according to claim 13, wherein the lid member includes a first cover portion for covering one side surface of the optical box and a second cover portion for covering the other side surface of the optical box opposite from the one side surface, and wherein one guided portion is provided on the first cover portion, and the other guided portion is provided on the second cover portion.

15. The image forming apparatus according to claim 14, further comprising:

a light source emitting the laser light for scanning one of the plurality of photosensitive members; and a circuit board including an electrical circuit for driving the light source, wherein the first cover portion is provided so as to cover the circuit board.

16. The image forming apparatus according to claim 13, wherein each of the guided portions has an elongated shape along an arrangement direction of the plurality of photosensitive members.

17. The image forming apparatus according to claim 13, wherein the housing includes a first side plate, a second side plate facing the first side plate, and a middle plate provided across the first side plate and the second side plate, and wherein the pair of support members are fixed on the middle plate.

18. The image forming apparatus according to claim 13, wherein in a state where the scanning unit is fixed to the housing, the guided portions are not in contact with the pair of support members.

* * * * *